May 31, 1938. H. J. THOMAS 2,118,989
THREAD CUTTING MACHINE FOR FINISH RINGS
Filed March 22, 1937 4 Sheets-Sheet 1
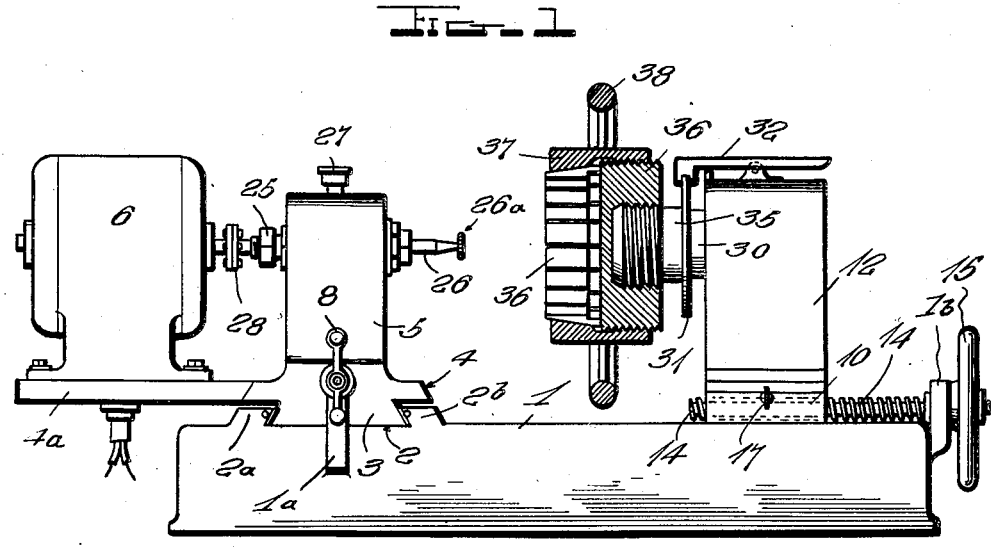
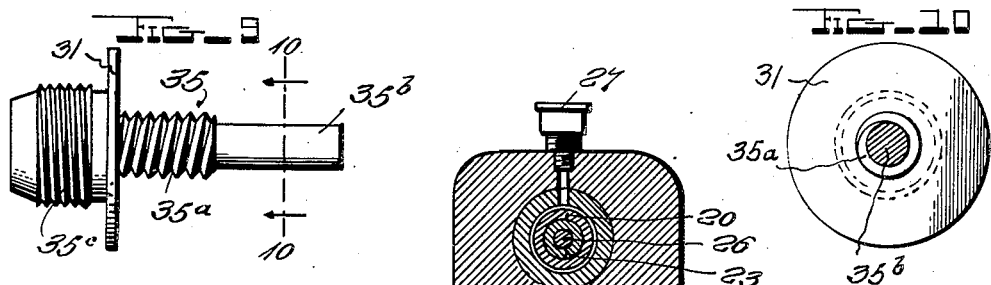
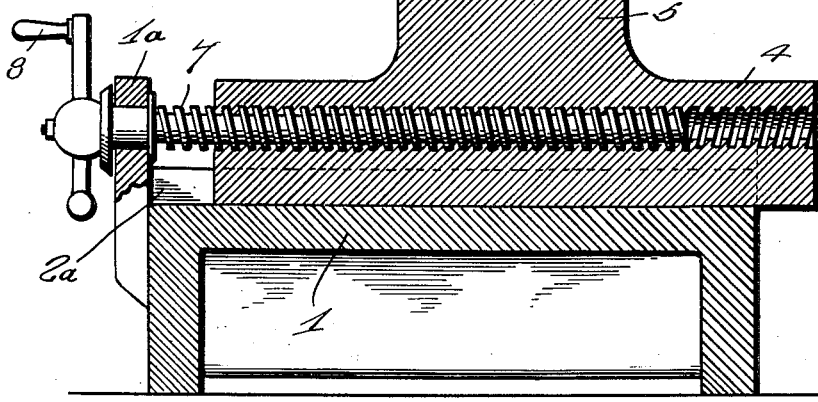
INVENTOR.
Howard J. Thomas,
BY John B. Brody
ATTORNEY.

May 31, 1938. H. J. THOMAS 2,118,989
THREAD CUTTING MACHINE FOR FINISH RINGS
Filed March 22, 1937 4 Sheets-Sheet 2
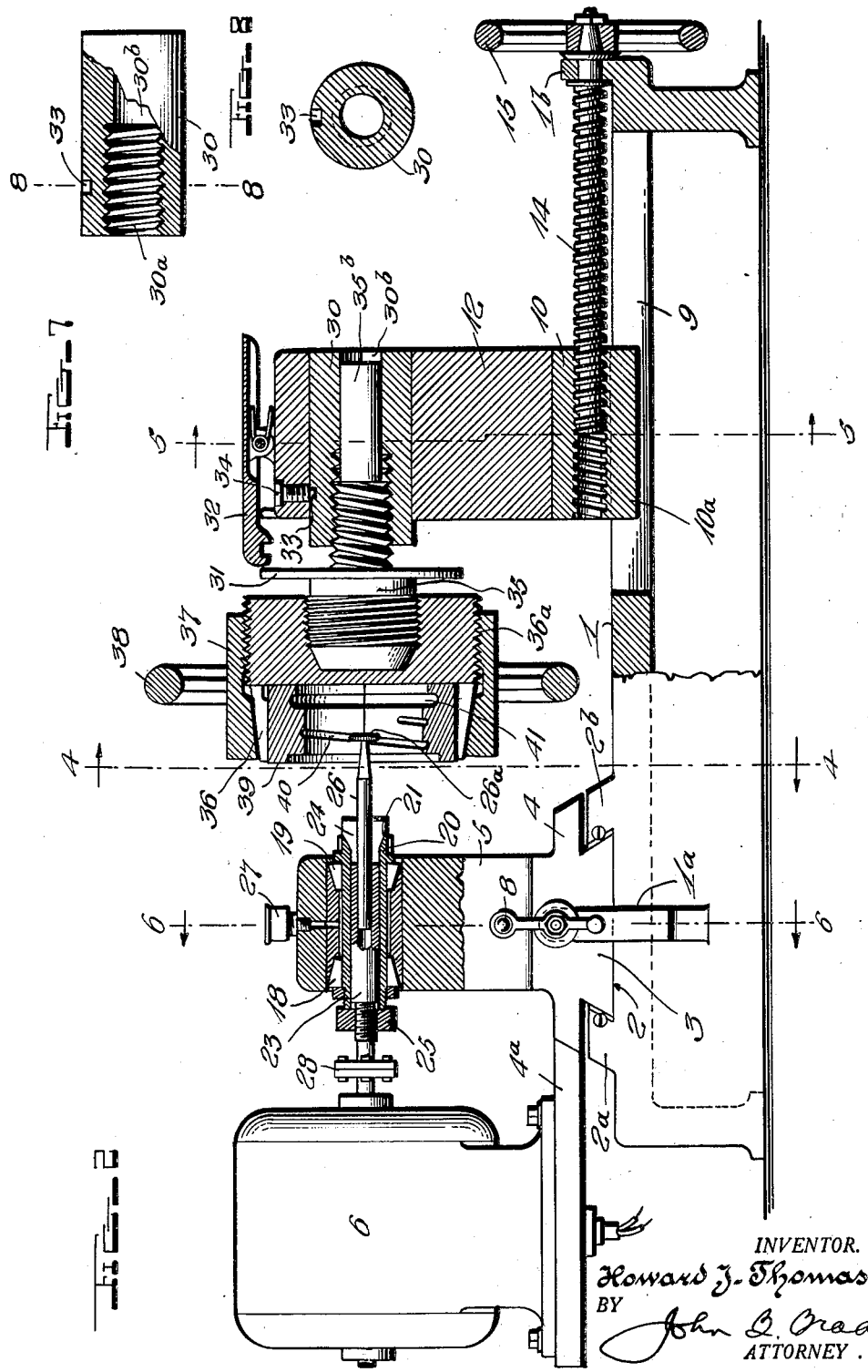
INVENTOR.
Howard J. Thomas,
BY
John B. Brady
ATTORNEY.

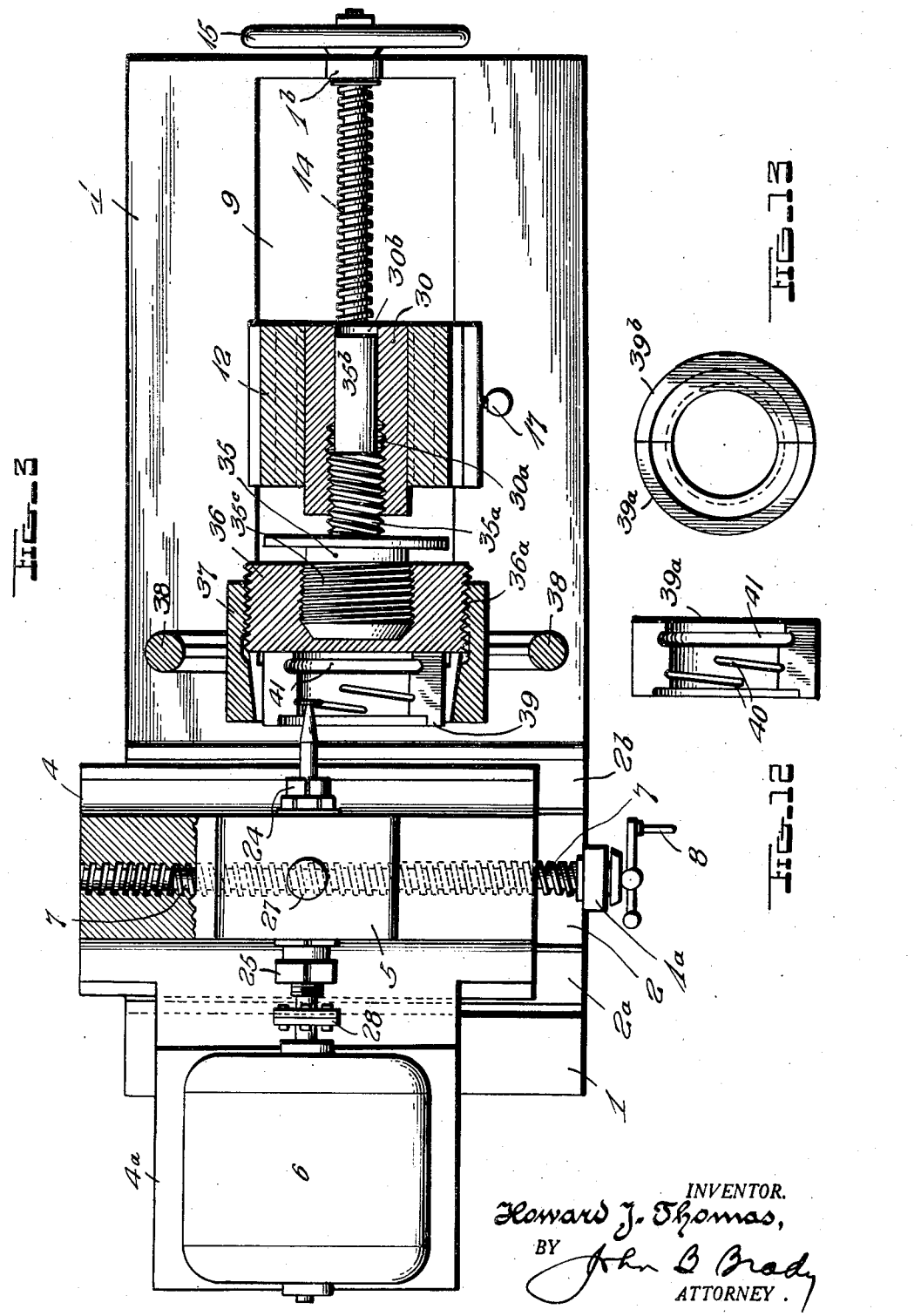

May 31, 1938. H. J. THOMAS 2,118,989
THREAD CUTTING MACHINE FOR FINISH RINGS
Filed March 22, 1937 4 Sheets-Sheet 4
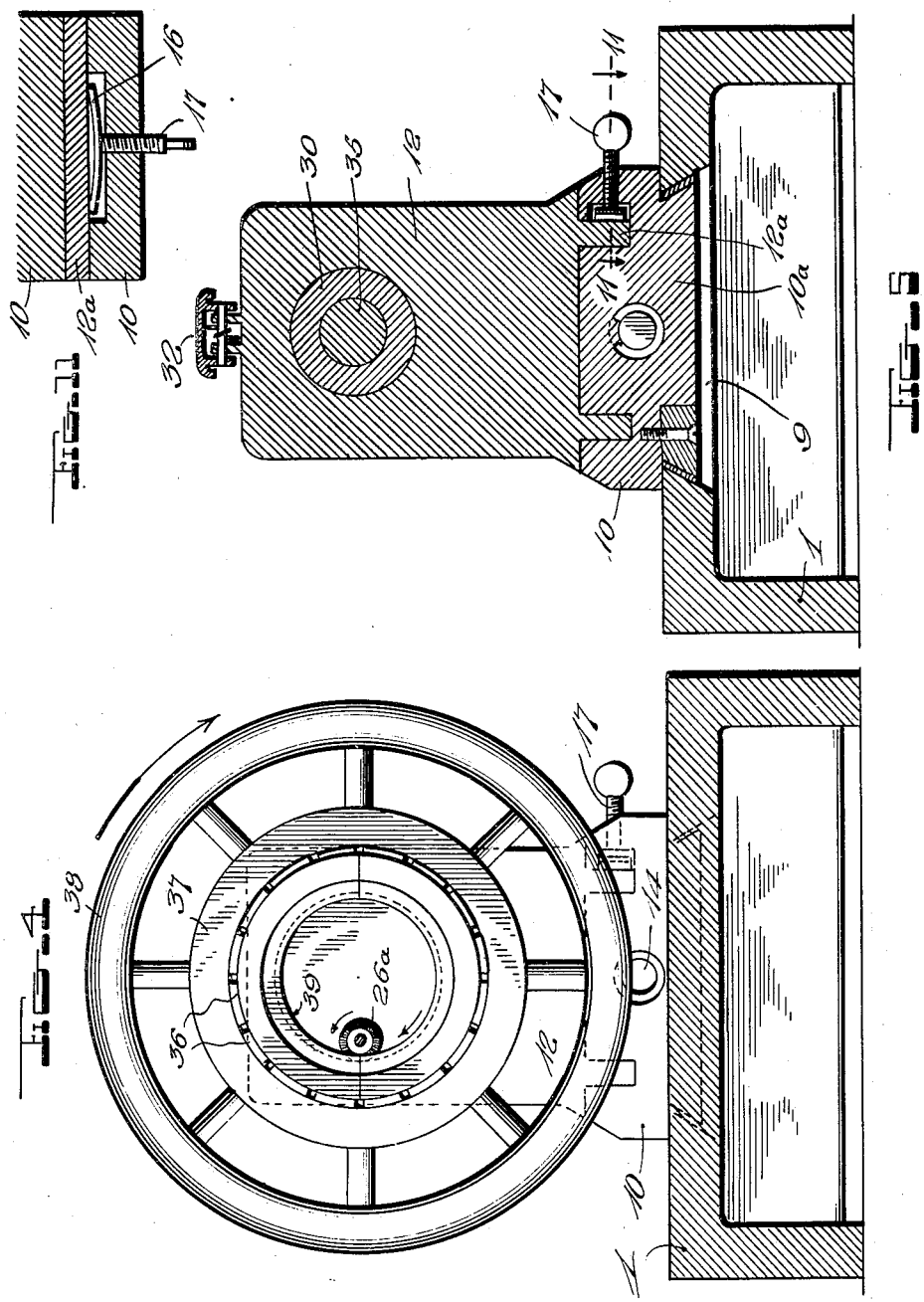
INVENTOR.
Howard J. Thomas,
BY
John B. Brady
ATTORNEY.

Patented May 31, 1938

2,118,989

UNITED STATES PATENT OFFICE 2,118,989

THREAD CUTTING MACHINE FOR FINISH RINGS

Howard J. Thomas, Jackson, Miss., assignor to Knox Glass Bottle Company, Jackson, Miss., a corporation of Mississippi Application March 22, 1937, Serial No. 132,373

8 Claims. (Cl. 10—154)

My invention relates broadly to thread cutting machines and more particularly to a lathe for cutting continuous and jump threads in finish rings used in conjunction with moulds in the manufacture of glass containers.

Such finish rings comprise ordinarily a pair of mated semicircular members adapted to be separated to free the container when completed. The thread cut in the finish ring is rounded in shape and is begun at a substantial distance from the edge of the ring so that the thread on the container is formed entirely on the face of the neck portion of the container permitting the sealing edge of the neck to be of uniform width.

One of the objects of my invention is to provide a thread cutting machine particularly adapted for the cutting of threads in finish rings, and having a rotary cutting tool adjustable and interchangeable for various thread sizes.

Another object of my invention is to provide a thread cutting machine for finish rings, having interchangeable chuck means for holding the finish ring, and adjustable means for positioning the finish ring with respect to a rotary cutting tool.

A further object of my invention is to provide a thread cutting machine for finish rings having a rotary cutting tool adjustable for various thread depths and chuck means holding the finish ring and having a feed screw connected therewith for determining the pitch of the threads cut as the ring is advanced with respect to the cutting tool.

Still another object of my invention is to provide a thread cutting machine for finish rings having manual work feeding means connected with a work holding chuck, the work being advanced in accordance with the pitch of a feed screw connected with the chuck.

A still further object of my invention is to provide a thread cutting machine for finish rings having an interchangeable feed screw connected with a work holding chuck adapted to be moved with respect to a rotary cutting tool.

Still another object of my invention is to provide a thread cutting machine for finish rings having interchangeable chuck means for holding the finish ring, adjustable means for positioning the finish ring with respect to a rotary cutting tool, and auxiliary adjusting means for accommodating chuck means of extreme sizes.

Other and further objects of my invention reside in the structure and arrangement of parts hereinafter more fully set forth with reference to the accompanying drawings, in which:

Figure 1 is a side elevation of the machine partially in section and ready to receive the finish ring to be threaded; Fig. 2 is a central vertical longitudinal section thereof on an enlarged scale showing a ring in the chuck; Fig. 3 is a top plan view of the machine partly in horizontal section; Fig. 4 is a transverse vertical section taken on line 4—4 of Fig. 2, looking in the direction of the arrows; Fig. 5 is a transverse vertical section taken on line 5—5 of Fig. 2, looking in the direction of the arrows; Fig. 6 is a transverse vertical section taken on line 6—6 of Fig. 2, looking in the direction of the arrows; Fig. 7 is a detail side elevation partially in section of the interchangeable spindle nut forming part of the feed means; Fig. 8 is a transverse vertical section taken on line 8—8 of Fig. 7; Fig. 9 is a side elevation of the interchangeable threaded sleeve, for cutting various size threads; Fig. 10 is a transverse vertical section taken on line 10—10 of Fig. 9, looking in the direction of the arrows; Fig. 11 is a detail horizontal section taken on line 11—11 of Fig. 5; Fig. 12 is a face view of one half of a threaded ring; and Fig. 13 is a front elevation of the complete ring.

Referring to the drawings in more detail, Fig. 1 is a general view of the machine with the work holding chuck withdrawn from the rotary cutting tool to permit the insertion of a blank finish ring to be threaded. The apparatus of my invention includes a rectangular base 1 having transverse guide means and longitudinal guide means formed in the top portion. The transverse guide means, as shown in the drawings, consists of a pair of parallel strip portions 2a and 2b, undercut on their opposed faces so as to form a dove-tail groove 2 adapted to receive the dove-tail projection 3 of a platform member 4 which carries the tool post 5. The platform 4 has an extension 4a upon which is mounted an electric motor 6 for driving the tool. The base 1 is provided with an upstanding bearing member 1a, at one end and in the middle of the transverse guide groove 2, for carrying an adjusting screw 7 which has a crank 8 connected therewith. The platform 4 is threaded as shown more particularly in Figs. 3 and 6 to receive the screw 7, whereby the transverse position of the tool may be adjusted by turning the crank 8.

The longitudinal guide means in the base 1, as shown in the drawings, consists of a slot 9, having the opposed longitudinal faces thereof undercut so as to form a dove-tail engagement for a projection 10a from the base 10 of the headstock 12, as shown more clearly in Fig. 5. The base 1 is provided with an upstanding bearing member 1b at the outer end and in the middle of the longitudinal slot 9 for carrying an adjusting screw 14 which has a wheel handle 15 connected therewith. The base 10 of the headstock is threaded to receive the screw 14, as shown more particularly in Fig. 2, whereby the longitudinal position of the headstock 12, with respect to the base 1 and the tool post 5 may be adjusted by rotation of the screw 14 by the wheel 15.

A further longitudinal adjustment of the headstock 12 is provided by a tongue and groove connection, as shown in Fig. 5, between the headstock 12 and the base 10. This connection is normally maintained rigid by virtue of the clamping means shown in Figs. 5 and 11, which comprises a sturdy, resilient abutting member 16 and a clamping screw 17 threaded into the base 10 for forcing the member 16 against the tongue 12a on the headstock 12. This auxiliary adjustment of the headstock is provided for use in instances where the size of the work is such that adjustment within the set range of screw 14 is not adequate. In such cases the relative position of the headstock 12 on base 10 is altered and the screw 14 employed as usual to set the work accurately.

Referring now more particularly to the thread cutting means, the tool post 5, as shown in Fig. 2, is provided with bearings 18 and 19 supporting the chuck sleeve 20 which has a tapered inner face 21 adjacent one end. Within the sleeve 20 is the tool chuck 23 having a tapered collar portion 24 adapted to be drawn against the tapered face 21 of the sleeve 20 by nut 25 engaging the chuck 23 and bearing on the opposite end of sleeve 20. A tool 26 is thus removably mounted for rotation in the bearings 18, 19, which are lubricated from a grease cup 27 mounted on the tool post 5 as shown. Suitable coupling means at 28 connects the tool chuck 23 with the electric motor 6 which is mounted on the extension 4a of platform 4 and thus movable with the tool post 5 and providing positive drive for the tool 26. The tool has a cutter 26a carried at the end thereof, which is preferably formed with a cutting edge of rounded contour so as to produce the desired shape of thread in the finish ring.

The headstock 12 is provided with interchangeable means for feeding work to the cutter 26a for forming threads of different pitch, as well as interchangeable work holders for accommodating finish rings of various sizes. Generally speaking, a finish ring of greater diameter may take a larger thread cut and consequently, a thread of greater pitch, than a smaller finish ring. The headstock 12 is apertured longitudinally to receive a sleeve member 30 having a recess 33 cut in the exterior face thereof, and the headstock 12 is provided with a pin member 34 adapted to engage recess 33 to prevent movement of the sleeve member 30. The pin member or screw 34 may be disposed in any conveniently accessible position in the headstock 12, instead of in the position indicated in Fig. 2.

The interior face of the sleeve member 30 is threaded at 30a to correspond to exterior screw threads 35a on a spindle nut 35, these threads having a pitch equal to the desired pitch of thread to be cut in the finish ring, and constituting feed means for the ring with respect to the cutter.

Spindle 35 is provided with a flange 31 and on the headstock 12 is provided a spring actuated catch 32, adapted to engage the flange 31, for retaining the spindle 35 in fixed longitudinal relation but permitting rotation thereof with the sleeve member 30, when the latter is not engaged by pin 34, as will hereinafter be described.

The sleeve 30 and nut 35 have unthreaded portions 30b and 35b, respectively, adapted to stabilize the relative movement thereof. The spindle nut 35 has a screw threaded enlarged head 35c for mounting a work chuck 36, including a clamping ring 37 having a ring shaped handle 38 fixed thereto by spokes, as shown more clearly in Fig. 4. The clamping ring 37 engages work chuck 36 by means of screw threads 36a as shown. It is preferred that the screw threads 36a and the threads on the enlarged portion 35c of the spindle nut should be opposite to those at 30a, 35a, between the sleeve member 30 and the spindle nut 35; in the drawings, the former are shown as right-hand threads and the latter is shown as a left-hand thread.

Figs. 7 and 8 illustrate more particularly the sleeve member 30, with its recess 33 and the interior threaded and unthreaded portions thereof. Figs. 9 and 10 illustrate more particularly the spindle nut 35, with its flange 31 and the unthreaded and oppositely threaded portions thereof. It will be understood from the structure above described that various sizes of work chucks may be interchanged on the spindle nut for use with the same spindle nut and sleeve, and likewise various pairs of spindle nuts and sleeves of different thread pitch may be interchanged in the headstock 12 for use with the same work chuck.

For operation, a blank finish ring is secured in the work chuck, as at 39, by tightening the clamping ring 37. The flange 31 is released from the spring catch 32 and the chuck is moved until the flange is clear of the catch 32. By means of crank 8 and wheel 15, the cutting tool is set at the point on the inner face of the ring where the thread is to be begun. Preferably this point is near the outer edge of the ring as it is held in the machine. Motor 6 is started, driving the tool at proper speed in the direction indicated in Fig. 4. The depth of cut desired is then adjusted by crank 8 and the work is fed to the cutter by means of handle 38 which is rotated clockwise as seen in Fig. 4, or anti-clockwise as desired, and the screw thread 40 is cut, in accordance with the pitch of the threads 35a, 30a on the spindle nut and the sleeve member. So long as the wheel 15 is kept in adjusted position the thread may be retraced and cut deeper, as may be desired. When the thread has been completed the headstock 12 is withdrawn from the cutter by wheel 15 and the threaded ring withdrawn.

Jump threads may be simply cut in finish rings by means of the machine of my invention. Jump threads, as distinguished from continuous threads, are formed as segments of a continuous thread and are employed to advantage on the necks of bottles and the like for sanitary and other reasons. For cutting jump threads, the machinist retracts the cutting tool after cutting the desired segment of a thread and advances the work, without cutting, to the point where the next segment of the thread is to be begun, and then resumes the cutting operation. Segments are usually arranged so as to be staggered in adjacent threads.

The completed finish ring 39 has been shown, in Figs. 12 and 13, as comprising two semicircular members 39a, 39b which have been machined, prior to threading, with the required degree of accuracy. The two portions of the ring are held securely together in the type of work chuck I have illustrated, and it is preferred that the thread 40 begin and end on the same segment as shown in Fig. 12.

In Fig. 12, it will also be noted, the finish ring may be provided with a plain circumferential groove 41 which is adapted to form a shoulder on the glass container beneath the threads. This groove may conveniently be formed on the machine of my invention by a slight adaptation of the structure as described. It will be remembered that the pin member 34 is provided to engage recess 33 in the sleeve member 30 and prevents rotation of the sleeve member. When it is desired to cut simply the circumferential groove 41, the flange 31 on spindle nut 35 is engaged by the spring catch 32, as shown for convenience in Fig. 1, and pin 34 is withdrawn from the recess 33. The spring catch 32, engaging the flange 31 permits rotation of the work chuck, spindle nut, and sleeve member as a unit so that when the work is correctly positioned by wheel 15 with respect to the cutter, the circumferential groove 41 may be formed, the work being fed by handle 38 and the feed screw means 30a, 35a, being inoperative. It will be understood that various sizes of cutters may be secured in the tool chuck 23, so that grooves of different dimensions may be cut in the same finish ring.

I have shown my invention in one preferred embodiment, but it will be apparent to those skilled in the art, that many modifications in the structure and design of the elements thereof may be made within the scope of my invention. I desire it to be understood, therefore, that no limitations upon my invention are intended except as are imposed by the appended claims.

What I claim as new and desire to secure by Letters Patent of the United States is as follows:

1. A metal working machine comprising, in combination, a base, a tool post, and a headstock, means for adjusting said tool post and said headstock along lines normal to each other, a rotary cutting tool supported in said tool post, a work chuck, and means for rotatively mounting said chuck in said headstock on an axis parallel with the axis of said rotary cutting tool including a spindle having a radially extending flange, and a releasable guide catch carried by said headstock and engaged with said flange for maintaining said chuck rotatable in a fixed plane with respect to said tool.

2. A metal working machine comprising, in combination, a base, a tool post, and a headstock, means for adjusting said tool post and said headstock along lines normal to each other, a rotary cutting tool supported in said tool post, a work chuck, means for mounting said chuck in said headstock including a screw threaded spindle fixed to said chuck and a screw threaded sleeve member non-rotatively mounted in said headstock, said spindle being extended from said headstock and being engaged with said chuck for supporting said chuck at a position spaced from said headstock, and a flange on said spindle between said chuck and said headstock and adapted to abut said sleeve member.

3. A metal working machine comprising, in combination, a base, a tool post, and a headstock, means for adjusting said tool post and said headstock along lines normal to each other, a rotary cutting tool supported in said tool post, a work chuck, means for rotatively mounting said chuck in said headstock, means for advancing said chuck with respect to said tool at a predetermined pitch, means for releasing the last said means, and means connected with said headstock for maintaining said chuck rotatable in a fixed plane with respect to said tool.

4. In a thread cutting machine, a rotary cutting tool, a work chuck, and interchangeable means for rotatively feeding work to said tool comprising an interiorly screw-threaded sleeve member adapted to be non-rotatively mounted in said machine, an exteriorly screw threaded spindle mounted in said sleeve member and adapted to support said work chuck, said sleeve member and said spindle being paired for cutting a screw thread of desired pitch, said chuck being rotatable with said spindle in said sleeve member for feeding work to said tool at the pitch of the screw threads on said screw-threaded sleeve member, and means for allowing rotation of said screw-threaded sleeve member with said spindle whereby the screw threads are substantially inoperative.

5. A metal working machine comprising, in combination, a base, a tool post, and a headstock, means for adjusting said tool post with respect to said headstock, a rotary cutting tool supported in said tool post, a work chuck mounted in said headstock, and selective work feeding means disposed between said work chuck and said headstock for rotatably, and axially and rotatably, advancing said work chuck with respect to said cutting tool, said feeding means being selectively operable for cutting circumferential grooves and screw threads, respectively.

6. A metal working machine for finish rings adapted to cut circumferential grooves and continuous and jump threads in the inner cylindrical surface of said rings, comprising a work chuck adapted to support a finish ring, a rotary cutting tool of substantially smaller diameter than half the inner diameter of said finish ring rotatable on an axis parallel to the axis of said ring, and a combination of feeding means constructed and arranged with respect both to said work chuck and said cutting tool so as to effect simple rotary, a combination of rotary and axial, and a combination of rotary, axial and radial relative movements of said tool and the finish ring in said chuck.

7. A metal working machine for finish rings adapted to cut circumferential grooves and threads in the inner cylindrical surface of said rings, comprising a work chuck adapted to support a finish ring, a rotary cutting tool rotatable on an axis parallel to the axis of said ring, and a combination of feeding means constructed and arranged with respect to both said work chuck and said cutting tool so as to effect simple rotary and a combination of rotary and axial relative movements of said tool and the finish ring in said chuck.

8. In a metal working machine, a headstock comprising a base, an interiorly screw threaded sleeve member releasably mounted in said base, a spindle having a screw threaded portion engageable in the screw threaded portion of said sleeve member, a radially extending flange on said spindle, means on said base releasably engageable with said flange, a work chuck mounted on said spindle, said sleeve member and said means being selectively operable with respect to said chuck for determining the manner of feeding work in said machine, and means for rotating said chuck.

HOWARD J. THOMAS.